(12) United States Patent
Noh et al.

(10) Patent No.: US 8,367,753 B2
(45) Date of Patent: Feb. 5, 2013

(54) POLYPROPYLENE RESIN COMPOSITION FOR CREATING FABRIC TEXTURE

(75) Inventors: Jung Gyun Noh, Gyeonggi-do (KR); Dae Sik Kim, Gyeonggi-do (KR); Kyeong Hoon Jang, Seoul (KR); Byung-Woo Ahn, Incheon (KR); Jeong-Yeol Yu, Gyeonggi-do (KR)

(73) Assignees: Hyundai Motor Company, Seoul (KR); Kia Motors Corporation, Seoul (KR); Hyundai Engineering Plastics Co., Ltd., Chungcheongnam-do (KR)

( * ) Notice: Subject to any disclaimer, the term of this patent is extended or adjusted under 35 U.S.C. 154(b) by 0 days.

(21) Appl. No.: 12/890,823

(22) Filed: Sep. 27, 2010

(65) Prior Publication Data

US 2011/0130487 A1    Jun. 2, 2011

(30) Foreign Application Priority Data

Dec. 2, 2009  (KR) .................. 10-2009-0118662

(51) Int. Cl.
*C08L 1/02* (2006.01)
*C08L 95/00* (2006.01)
(52) U.S. Cl. .................... 524/35; 524/71; 524/451
(58) Field of Classification Search .............. 524/35, 524/71, 451
See application file for complete search history.

(56) References Cited

FOREIGN PATENT DOCUMENTS

| JP | 2004002680 A | 1/2004 |
|---|---|---|
| JP | 2005120256 A | 5/2005 |
| JP | 2006257332 A | 9/2006 |
| JP | 2007077186 A | 3/2007 |
| KR | 10-0422913 | 5/2003 |
| KR | 10-2005-0023929 | 3/2005 |
| KR | 10-0570030 | 4/2005 |
| KR | 1020050023929 A * | 4/2005 |
| KR | 10-0535611 | 10/2005 |
| KR | 10-2010-0000379 | 1/2010 |
| KR | 10-0957310 | 1/2010 |
| KR | 1020100000379 A * | 1/2010 |
| KR | 10-0943435 | 2/2010 |

* cited by examiner

*Primary Examiner* — Robert D. Harlan
(74) *Attorney, Agent, or Firm* — Edwards Wildman Palmer LLP; Peter F. Corless

(57) ABSTRACT

According to preferred aspects, the present invention provides a polypropylene resin composition for creating a fabric texture, the polypropylene resin composition comprising: a polypropylene resin containing at least two selected from the group consisting of a homopolypropylene, a propylene-ethylene copolymer, and a high crystalline polypropylene (HCPP); a polypropylene elastomer; an ethylene-α-olefin copolymer; an inorganic filler; a cellulose fiber; and a volcanic rock. A molded product prepared using the polypropylene resin composition of the present invention has matt properties, do not cause odor due to their excellent VOC adsorption capabilities, and have excellent properties such as low temperature impact resistance, scratch resistance, etc.

14 Claims, No Drawings

POLYPROPYLENE RESIN COMPOSITION FOR CREATING FABRIC TEXTURE

CROSS-REFERENCE TO RELATED APPLICATION

This application claims under 35 U.S.C. §119(a) the benefit of Korean Patent Application No. 10-2009-0118662 filed Dec. 2, 2009, the entire contents of which are incorporated herein by reference.

BACKGROUND (a) Technical Field

The present disclosure relates generally to a polypropylene resin composition for creating a fabric texture. More particularly, it relates to a polypropylene resin composition comprising a polypropylene resin containing at least two selected from a homopolypropylene, a propylene-ethylene copolymer, and a high-crystalline polypropylene (HCPP); a polypropylene elastomer; an ethylene-α-olefin copolymer; an inorganic filler; a cellulose fiber; and a volcanic rock.

(b) Background Art

As recent trends have moved towards high quality vehicles, plastic parts for vehicle interior components such as a door trim, a pillar trim, etc. are required to have a luxurious quality. Therefore, the plastic parts for vehicle interior components are wrapped or painted with fibers to improve the vehicle interior quality. However, the method of wrapping or painting the plastic parts with fibers has drawbacks, such as an increase in cost due to the additional process, deterioration of quality, and environmental pollution in the vehicle interior due to the odor caused by volatile organic compounds (VOC) due to the use of organic solvent and adhesive.

Extensive research has been conducted to address these issues. Of them, a method of directly spraying cellulose fibers onto a plastic part has certain drawbacks, such as the production of VOC due to the use of adhesive during processing, and an increase in cost due to a post process. Alternatively, a method of directly adding at least two cellulose fibers to a polypropylene resin to create a fabric texture to the resin itself is disclosed in Korean Patent No. 10-61496, incorporated by reference in its entirety herein. Although this method does not require an additional process for an injection-molded product, the fabric texture varies according to the color of the plastic part and there are many limitations in applying this method to various embossing patterns on the plastic parts for vehicle interior components. Further, the method, which depends on the color difference and size of cellulose fibers to create the colors of plastic parts, cannot produce a desired fabric texture due to the tangle and cut of cellulose fibers during resin processing. Furthermore, when the cellulose fibers are directly added to the polypropylene resin, a masterbatch of cellulose fibers may be prepared in advance to improve the dispersion of cellulose fibers and then the cellulose fibers may be directly added to the masterbatch during resin processing or during injection molding. This method provides excellent dispersion of cellulose fibers in the polypropylene resin. However, the tangle of cellulose fibers and the reduction in their size are caused by a second process and thus the fabric texture is reduced when the resulting resin is used in plastic parts for vehicle interior components having embossed surfaces, which in turn increases the processing cost due to an additional process. Moreover, the existing cellulose fibers or synthetic cellulose fibers are carbonized at about 250° C., and thus the cellulose fibers are burned or discolored during injection molding of plastic parts, thus degrading the quality of the plastic parts.

Therefore, the there is an increased demand for new vehicle interior materials that can be used in high quality vehicle interior design.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a new polypropylene resin composition used for vehicle interior materials, which is less affected by an embossing pattern of plastic parts (molded products) for vehicle interior components, does not require an additional process after injection molding, and provides improved quality. In preferred embodiments, the polypropylene resin composition of the present invention comprises a polypropylene resin containing at least two selected from the group consisting of a homopolypropylene, a propylene-ethylene copolymer, and a high crystalline polypropylene (HCPP); a polypropylene elastomer; an ethylene-α-olefin copolymer; an inorganic filler; a cellulose fiber; and a volcanic rock, in which the cellulose fibers are not carbonized even at a high temperature of about 250° C. In other further preferred embodiments, the present invention provides a polypropylene resin composition for creating a fabric texture, which can satisfy the properties required for vehicle interior components and provide an improved quality.

In preferred embodiments, the present invention provides a polypropylene resin composition for creating a fabric texture, the polypropylene resin composition comprising a polypropylene resin containing at least two selected from the group consisting of a homopolypropylene, a propylene-ethylene copolymer prepared by polymerizing 50 to 99 wt % propylene monomer and 1 to 50 wt % ethylene monomer, and a high crystalline polypropylene (HCPP) prepared by polymerizing 90 to 99.9 wt % propylene monomer and 0.1 to 10 wt % $C_4$ to $C_{10}$ alkylene monomer; a polypropylene elastomer prepared by reacting 20 to 85 wt % ethylene-propylene rubber and 15 to 80 wt % homopolypropylene; an ethylene-α-olefin copolymer; an inorganic filler; at least one cellulose fiber selected from the group consisting of nylon, polyethylene terephthalate (PET), polybutylene terephthalate (PBT), and cellulose; and a volcanic rock.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above features and advantages of the present invention will be apparent from or are set forth in more detail in the following Detailed Description, which serves to explain by way of example the principles of the present invention.

DETAILED DESCRIPTION

As descried herein, the present invention features a polypropylene resin composition for creating fabric texture, the polypropylene resin composition comprising a polypropylene resin, a polypropylene elastomer, an ethylene-α-olefin copolymer, an inorganic filler, at least one cellulose fiber, and a volcanic rock.

In one embodiment, the polypropylene resin comprises at least two selected from the group consisting of a homopolypropylene, a propylene-ethylene copolymer prepared by polymerizing 50 to 99 wt % propylene monomer and 1 to 50 wt % ethylene monomer, and a high crystalline polypropylene (HCPP) prepared by polymerizing 90 to 99.9 wt % propylene monomer and 0.1 to 10 wt % C4 to C10 alkylene monomer.

In another embodiment, the polypropylene elastomer is prepared by reacting 20 to 85 wt % ethylene-propylene rubber and 15 to 80 wt % homopolypropylene.

In another further embodiment, the at least one cellulose fiber is selected from the group consisting of nylon, polyethylene terephthalate (PET), polybutylene terephthalate (PBT), and cellulose.

In another embodiment, the present invention features a vehicle interior material comprising the polypropylene resin composition of any one of the aspects as described herein.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

In preferred embodiments, the present invention provides a polypropylene resin composition for creating a fabric texture, the polypropylene resin composition preferably comprising (1) a polypropylene resin containing at least two selected from the group consisting of a homopolypropylene, a propylene-ethylene copolymer prepared by polymerizing 50 to 99 wt % propylene monomer and 1 to 50 wt % ethylene monomer, and a high crystalline polypropylene (HCPP) prepared by polymerizing 90 to 99.9 wt % propylene monomer and 0.1 to 10 wt % $C_4$ to $C_{10}$ alkylene monomer; (2) a polypropylene elastomer prepared by reacting 20 to 85 wt % ethylene-propylene rubber and 15 to 80 wt % homopolypropylene; (3) an ethylene-α-olefin copolymer; (4) an inorganic filler; (5) at least one cellulose fiber selected from the group consisting of nylon, polyethylene terephthalate (PET), polybutylene terephthalate (PBT), and cellulose; and (6) a volcanic rock.

In another preferred embodiment, the polypropylene resin composition according to the present invention may further comprise at least one additive selected from the group consisting of an antioxidant, an ultraviolet absorber, a photostabilizer, a pigment, a dispersant, a nucleating agent, a process lubricant, and a coupling agent, thus improving the properties of a molded product and the processing characteristics.

According to preferred exemplary embodiments, the present invention is characterized in that the polypropylene resin composition preferably comprises: 30 to 70 wt % polypropylene resin; 5 to 35 polypropylene elastomer; 5 to 30 wt % ethylene-α-olefin copolymer; 1 to 20 wt % inorganic filler; 1 to 5 wt % cellulose fiber; and 1 to 10 wt % volcanic rock.

The above-described components of the polypropylene resin composition according to preferred exemplary embodiments of the present invention will be described in detail below.

In certain preferred embodiments, the polypropylene resin (1) of the present invention comprises at least two selected from the group consisting of a homopolypropylene (a), a propylene-ethylene copolymer (b), and a high-crystalline polypropylene (c) and may be contained in an amount of 30 to 70 wt % with respect to the total weight of the polypropylene resin composition of the present invention. Preferably, if the amount of polypropylene resin used is less than 30 wt %, the overall properties of the molded product may be suitably reduced, whereas, in other certain exemplary embodiments, if it exceeds 70 wt %, the amount of other components used is much reduced and thus it may cause other problems. Accordingly, in other certain exemplary embodiments of the present invention, it is preferred that the polypropylene resin is suitably contained in the range mentioned above. Preferably, if the polypropylene resin (1) comprises at least "one" selected from the group consisting of the homopolypropylene (a), the propylene-ethylene copolymer (b), and the high-crystalline polypropylene (c), the impact resistance and surface glossiness of the molded product may be suitably reduced, and thus it is preferred that the polypropylene resin (1) comprises at least "two" resins, and it is more preferred that the polypropylene resin (1) comprises all three resins. Preferably, in the case where the three resins are used, the homopolypropylene (a), the propylene-ethylene copolymer (b), and the high-crystalline polypropylene (c) are suitably mixed in a weight ratio of 1:0.5 to 1.5:0.5 to 1.5 to satisfy the mechanical properties required for the vehicle interior components.

According to certain preferred embodiments of the present invention, the homopolypropylene (a) may have an isotactic index of 94 to 97% measured by $C_{13}$-NMR and a melt index of 0.5 to 100 g/10 min (2.16 kg, 230° C.). According to preferred exemplary embodiments, if the isotactic index is greater than the above range, the scratch resistance of the molded product may be suitably reduced and, if the melt index falls within the range, it is advantageous in view of molding properties.

In other further preferred embodiments, the propylene-ethylene copolymer (b) comprises 50 to 99 wt % propylene monomer and 1 to 50 wt % ethylene monomer with respect to the total weight of the polypropylene-ethylene copolymer. Preferably, if the content of propylene monomer exceeds the range mentioned above, the mechanical properties of the molded product may be suitably reduced, and the amount of ethylene monomer used is a relative value determined with respect to the content of propylene. In further preferred embodiments, the propylene-ethylene copolymer may have a melt index of 0.5 to 100 g/10 min (2.16 kg, 230° C.).

According to certain preferred embodiments of the present invention, the high-crystalline polypropylene (c) may have an isotactic index of 97% or higher measured by $C_{13}$-NMR, more preferably 97.5 to 99.5%, and a melt index of 5 to 40 g/10 min (2.16 kg, 230° C.). According to certain exemplary embodiments, if the isotactic index is less than 97%, the strength and surface hardness of the molded product is too low to be used as suitable vehicle interior materials. In other exemplary embodiments, if the melt index is less than 5 g/10 min (2.16 kg, 230° C.), the liquidity and moldability may be suitably reduced, whereas, if it exceeds 40 g/10 min (2.16 kg, 230° C.), the impact resistance of the molded product may be considerably reduced. Preferably, the high-crystalline polypropylene (c) comprises 90 to 99.9 wt % propylene monomer and 0.1 to 10 wt % $C_4$ to $C_{10}$ alkylene monomer. In other exemplary embodiments of the present invention, if the content of $C_4$ to $C_{10}$ alkylene monomer is less than 0.1 wt %, the strength balance may be suitably reduced, whereas, if it exceeds 10 wt %, the impact resistance may be suitably reduced. Preferably, the amount of propylene monomer used is a relative value that is suitably determined with respect to the content of $C_4$ to $C_{10}$ alkylene monomer.

According to certain preferred embodiments of the present invention, the polypropylene elastomer (2) of the present invention is a reactor-made thermoplastic polyolefin (RTPO) prepared by directly reacting 20 to 85 wt % ethylene-propylene rubber and 15 to 80 wt % homopolypropylene in a gas phase reactor to maximize the dispersion of rubber and increase the content of rubber in a polypropylene matrix. Preferably, the polypropylene elastomer (2) may be suitably contained in an amount of 5 to 30 wt % with respect to the total weight of the polypropylene resin composition of the present invention. Preferably, if the amount of polypropylene elastomer used is less than 5 wt %, the impact resistance and scratch resistance of the molded product may be suitably reduced, whereas, if it exceeds 30 wt %, the glossiness of the molded product is suitably increased to reduce the effect of creating the fabric texture.

According to other preferred embodiments of the present invention, the ethylene-α-olefin copolymer (3) of the present invention may have a Mooney viscosity of 5 to 60 ML1+4 (at 121° C.), more preferably 20 to 40 ML1+4 (at 121° C.), which is advantageous in creating the fabric texture. Further, the ethylene-α-olefin copolymer (3) of the present invention may have a glass transition temperature of −65 to −50° C. Preferably, if the glass transition temperature of the ethylene-α-olefin copolymer is less than −65° C., the strength and heat resistance of the molded product may be suitably reduced, whereas, if it exceeds −50° C., the low temperature impact resistance may be suitably reduced. Although the type of ethylene-α-olefin copolymers which can be used in the present invention is not particularly limited, according to certain exemplary embodiments, it is preferred to use at least one selected from the group consisting of ethylene-α-($C_4$ to $C_8$) alkylene copolymers, and in still other exemplary embodiments, it is more preferred to use at least one selected from the group consisting of an ethylene-α-butylene copolymer and an ethylene-α-octylene copolymer. Preferably, the ethylene-α-olefin copolymer (3) may be contained in an amount of 5 to 30 wt % with respect to the total weight of the polypropylene resin composition of the present invention. According to preferred embodiments of the present invention, if the amount of ethylene-α-olefin copolymer used is less than 5 wt %, the impact resistance of the molded product may be considerably reduced, whereas, if it exceeds 30 wt %, the heat resistance of the molded product may be reduced. It is preferred that the polypropylene elastomer (2) and the ethylene-α-olefin copolymer (3) are used in a weight ratio of 60 to 70:30 to 40, which is effective in balancing the overall properties of the molded product required for the vehicle interior components.

In other preferred embodiments, the inorganic filler (4) of the present invention serves to suitably increase the strength of the molded product and may comprise plate-like talc particles having an average particle size of 0.5 to 10 μm. Preferably, if the average particle size of the talc is less than 0.5 μm, the productivity of the molded product may be suitably reduced, whereas, if it exceeds 10 μm, the overall mechanical properties of the molded product may be suitably reduced. In addition to the talc, the inorganic filler may further comprise wollastonite, barium sulfate, calcium carbonate, silica, mica, calcium silicate, magnesium whisker, or glass fiber. According to further preferred embodiments, the inorganic filler (4) may be suitably contained in an amount of 1 to 20 wt %, more preferably 5 to 15 wt %, with respect to the total weight of the polypropylene resin composition of the present invention. In certain preferred embodiments, if the amount of inorganic filler used is less than 1 wt %, the strength of the molded product may be suitably reduced, whereas, if it exceeds 20 wt %, the amount of other components used is relatively reduced, thus it may cause other problems.

Preferably, the cellulose fiber (5) of the present invention may comprise at least one selected from the group consisting of nylon, polyethylene terephthalate (PET), polybutylene terephthalate (PBT), and cellulose. In further preferred embodiments, the cellulose fiber may have at least two color differences and a complementary color relationship with the same chromatic cellulose fiber. Preferably, the cellulose fiber may have a diameter of 3 to 40 μm and a length of 0.3 to 4 mm. If the diameter of the cellulose fiber is less than 3 μm, a desired fabric texture cannot be suitably obtained, whereas, if it exceeds 40 μm, the impact resistance of the molded product may be suitably reduced. Moreover, if the length of the cellulose fiber is less than 0.3 mm, the fabric texture may be suitably reduced, whereas, if it exceeds 4 mm, the tangle of cellulose fibers may occur during resin manufacturing and during high pressure injection, which makes it difficult to uniformly disperse the cellulose fibers in the resin. According to certain exemplary embodiments, the amount of cellulose fiber used may be 1 to 5 wt %, more preferably 2 to 4 wt %, with respect to the total weight of the polypropylene resin composition of the present invention. Preferably, if the amount of cellulose fiber used is less than 1 wt %, a desired fabric texture cannot be suitably obtained, whereas, it exceeds 5 wt %, the tangle of cellulose fibers may occur due to the overuse.

According to certain preferred embodiments, the volcanic rock (6) of the present invention serves to suitably reduce the content of synthetic cellular fibers to below 50% and suitably improve the fabric texture to give an outstanding effect even in the embossing patterns of vehicle interior components. Moreover, since the volcanic rock is a spherical inorganic material, not a linear cellulose fiber, it serves to suitably improve the dispersion with the polypropylene resin and further improve the adsorption of volatile organic compounds (VOC) and the properties of the polypropylene resin composition. According to certain exemplary embodiments, preferably the volcanic rock may be used in the form of powder and have an average particle size of 10 to 150 μm, more preferably 40 to 100 μm. If the average particle size of the volcanic rock is less than 10 μm, the effect of creating the fabric texture and the adsorption of VOC may be suitably reduced, whereas, if it exceeds 150 μm, the overall balance of properties of the molded product may be suitably reduced. Moreover, in other exemplary embodiments, the volcanic rock may comprise at least one selected from the group consisting of a scoria rock and a basalt rock. In certain preferred embodiments, the amount of volcanic rock used may be 1 to 10 wt % with respect to the total weight of the polypropylene resin composition of the present invention. Preferably, if the amount of volcanic rock used is less than 1 wt %, the effect of the addition of volcanic rock cannot be suitably obtained due to the small amount, whereas, if it exceeds 10 wt %, the overall balance of properties of the molded product may be suitably reduced. Preferably, he scoria rock, one of the components of the volcanic rock, may comprise 40 to 50 wt % silicon oxide, 10 to 20 wt % aluminum oxide, 12 to 17 wt % iron oxide, 2 to 8 wt % titanium oxide, a predetermined amount of sodium oxide, and a predetermined amount of potassium oxide as the main components. According to certain preferred embodiments, since the heat resistance temperature of the scoria rock is 1,200° C. or higher, it can be used regardless of the type of the plastic part and the processing temperature. In the case where the volcanic rock comprising the scoria rock and the basalt rock is used, the mixture ratio varies according to the color of the matrix resin and, preferably, the scoria rock and the basalt rock may be mixed in a weight ratio of 1:0.2 to 0.5. If the weight ratio of the scoria rock and the basalt rock exceeds 1:0.5, it is difficult to create the colors of the polypropylene resin due to the dark color of the basalt rock. Accordingly, in preferred embodiments of the present invention, it is preferred that the scoria rock and the basalt rock are mixed in the range mentioned above.

The molded product prepared using the polypropylene resin composition of the present invention having the above-described components and their ratio has an excellent effect of creating the fabric texture and excellent mechanical properties and thus can be suitably used as the vehicle interior material.

Hereinafter, the present invention will be described in more detail with reference to Examples. However, the scope of the present invention is not limited to the following Examples.

EXAMPLES

Examples 1 to 6 and Comparative Examples 1 to 4

Polypropylene resin compositions were prepared using the components and their ratio shown in the following table 1 and injection-molded into test pieces (molded products) at a cylinder temperature of 220° C. and a mold temperature of 50° C. using an injection molding machine (model: LGE110, LS Cable Ltd.).

TABLE 1

| Components | | Examples (wt %) | | | | | | Comparative Examples (wt %) | | | |
|---|---|---|---|---|---|---|---|---|---|---|---|
| | | 1 | 2 | 3 | 4 | 5 | 6 | 1 | 2 | 3 | 4 |
| Polypropylene resin | PP-1[1] | 30 | 30 | 50 | 50 | 50 | 18 | 30 | 30 | 70 | 50.5 |
| | PP-2[2] | 20 | 20 | — | — | — | 18 | 20 | 20 | — | — |
| | PP-3[3] | — | — | — | — | — | 14 | — | — | — | — |
| Polypropylene elastomer[4] | | 20 | 20 | 20 | 20 | 20 | 20 | 20 | 20 | — | 20 |
| Ethylene-α-olefin[5] | | 7 | 8.5 | 8.5 | 5 | 5 | 5 | 7 | 8.5 | 8.5 | 5 |
| Inorganic filler | Talk[6] | 15 | 15 | 10 | 14.4 | 12 | 15 | 20 | — | 10 | 10 |
| Cellulose fiber | PET[7] | 1 | 0.5 | 0.5 | 0.3 | — | 1 | 1 | 0.5 | 0.5 | 0.5 |
| | PET[8] | 1 | 0.5 | 0.5 | — | 1.5 | 1 | 1 | 0.5 | 0.5 | 0.5 |
| | PET[9] | 1 | 0.5 | 0.5 | 0.3 | 1.5 | 1 | 1 | 0.5 | 0.5 | 0.5 |
| Volcanic rock | Scoria | 5 | — | 10 | — | 7 | 5 | — | 20 | 10 | 3 |
| | Scoria | — | 5 | — | 10 | — | — | — | — | — | — |
| | Basalt | — | — | — | — | 3 | 2 | — | — | — | 10 |

[1]PP-1: High crystalline polypropylene (HCPP); Met index 30 g/10 min (2.16 kg, 230° C.); Weight average molecular weight 221,000 g/mol; Isotactic index 98.5 to 99%; Model HJ640 manufactured by Hyosung Chemicals
[2]PP-2: Propylene-ethylene copolymer; Melt index 30 g/10 min (2.16 kg, 230° C.); Weight average molecular weight 210,000 g/mol
[3]PP-3: Homopolypropylene; Melt index 45 g/10 min (2.16 kg, 230° C.); Isotactic index 94 to 96%
[4]Polypropylene elastomer containing 30 wt % ethylene-α-propylene rubber and 70 wt % homopolypropylene
[5]Ethylene-α-octene: Mooney viscosity 24 to 25 ML1 + 4 (at 121° C.); Glass transition temperature −55 to −62° C.
[6]Average particle size: 8 to 10 μm manufactured by KOCH
[7]Polyethylene terephthalate (PET): Average diameter 15 μm; Average length 2 mm; Color black
[8]PET: Average diameter 7 μm; Average length 3 mm; Color red
[9]PET: Average diameter 20 μm; Average length 1 mm; Color brown
[10]Scoria: Average particle size 10 μm; Color reddish brown
[11]Scoria: Average particle size 100 μm; Color reddish brown
[12]Basalt: Average particle size 50 μm; Color dark gray

Test Example

The properties of the test pieces prepared in the above Examples and Comparative Examples were measured by the following methods and the results are shown in the following table 2.

(1) Melt index: measured according to ASTM D-1238 (Conditions: 230° C.; 2.16 kgf);

(2) Flexural modulus: measured according to ASTM D-790 (Test piece: 127×12.7×6.4 mm; Crosshead Speed 30 mm/min);

(3) Tensile strength: measured according to ASTM D-638 (Conditions: 30 mm/min; Gauge length 50 mm);

(4) Izod impact strength: measured according to ASTM D-256 (Test piece: 63.7×12.7×3 mm);

(5) Heat deflection temperature: measured according to ASTM D-648 (Test piece: 127×12.7×6.4 mm; 4.6 kgf);

(6) Mold shrinkage: measured in units of 1/1,000 using ASTM tensile test pieces by comparing the initial length with the shrinking length after 24 hours from the injection;

(7) Texture quality: evaluation was performed on the test pieces with embossed leather pattern (HL330) for vehicle interior components with the naked eye; and (8) VOC evaluation: measured according to MS300-55 as the reliability test method (Hyundai/Kia Motors).

TABLE 2

| Properties | Examples | | | | | | Comparative Examples | | | |
|---|---|---|---|---|---|---|---|---|---|---|
| | 1 | 2 | 3 | 4 | 5 | 6 | 1 | 2 | 3 | 4 |
| Melt index (g/10 min) | 18 | 18.5 | 17.8 | 17.5 | 18.2 | 18.1 | 19 | 18.3 | 25 | 19.3 |
| Tensile strength (kgf/cm$^2$) | 240 | 237 | 235 | 240 | 239 | 242 | 250 | 220 | 248 | 235 |
| Flexural modulus (kgf/cm$^2$) | 17500 | 17800 | 16700 | 17000 | 17200 | 17150 | 18000 | 15100 | 17600 | 16500 |
| Heat deflection temperature (° C.) | 120 | 121 | 120 | 122 | 122 | 121 | 123 | 115 | 123 | 118 |
| Izod at 23° C. (kg · cm/cm) | 7.8 | 8.2 | 8.1 | 7.9 | 8.3 | 8.1 | 6.5 | 8.2 | 6.8 | 7.5 |
| at −10° C. | 4.1 | 4.0 | 4.2 | 4.1 | 4.2 | 4.0 | 3.8 | 4.2 | 3.5 | 2.9 |
| Shrinkage (1/1,000) | 12.8 | 12.5 | 12.5 | 12.3 | 12.4 | 12.2 | 11.0 | 13.0 | 12.8 | 13.0 |
| Creation of fabric texture | Good | Good | Good | Very good | Good | Very good | Bad | Bad | Not bad | Not bad |
| VOD content (ppm) | 3.5 | 3.2 | 2.3 | 2.2 | 3.1 | 2.5 | 5.6 | 1.8 | 2.5 | 3.6 |

It can be seen from the results shown in Table 2 that the test pieces (molded products) prepared using the polypropylene resin compositions of Examples 1 to 6 generally had the good effect of creating fabric texture. However, the Comparative Examples generally did not have good fabric texture. In detail, the test pieces in Examples 1 and 2 had the effect of creating the fabric texture according to the difference in particle size of the scoria rock, and it could be seen that if the average particle size of the scoria rock is large, the same effect of creating fabric texture can be obtained, even though the content of synthetic cellulose fibers is small. Moreover, the test pieces in Examples 3 to 4 also had the effect of creating fabric texture according to the content of scoria rock, and even if the content of scoria rock was 10 wt %, it had a satisfactory texture. In particular, it can be seen that the test piece having an average particle size of 100 μm could minimize the content of synthetic cellulose fibers and had the good effect of creating fabric texture. Further, it can be seen that the test piece in Example 5 had the excellent effect of creating fabric texture even when a reddish brown scoria rock and a dark gray basalt rock were used at the same time.

On the contrary, in the case of Comparative Example 1, where no basalt rock was used, the tangle of cellulose fibers occurred and the effect of creating the fabric texture was reduced. Moreover, in the case of Comparative Example 2, where the scoria rock having an average particle size of 10 μm was added in an amount of 20 wt %, the test piece was discolored to reddish brown, the fabric texture was not created, and the strength and heat deflection temperature were reduced due to the absence of an inorganic filler. In the case of Comparative Example 3, where no polypropylene elastomer was used, the fabric texture was reduced due to an increase in surface gloss. In the case of Comparative Example 4, where no ethylene-α-olefin was used, the low-temperature impact resistance was not good.

As described herein, it can be seen from the above-described Examples and Test Example that the molded products prepared using the polypropylene resin compositions of the present invention have matt properties, do not cause odor due to their excellent VOC adsorption capabilities, and have excellent properties such as strength, low temperature impact resistance, etc. Moreover, the molded products prepared using the polypropylene resin compositions of the present invention have desirable effects of creating fabric texture with a luxurious quality, and thus can be widely used as vehicle interior materials, such as a door trim, a pillar trim, etc.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A polypropylene resin composition for creating fabric texture, the polypropylene resin composition comprising:
    20 wt % of a polypropylene elastomer prepared by reacting 20 to 85 wt % ethylene-propylene rubber and 15 to 80 wt % homopolypropylene;
    5 to 8.5 wt % of an ethylene-α-olefin copolymer;
    10 to 15 wt % of talc as an inorganic filler;
    0.6 to 3 wt % of at least one cellulose fiber selected from the group consisting of nylon, polyethylene terephthalate (PET), polybutylene terephthalate (PBT), and cellulose; and
    5 to 10 wt % of a volcanic rock; and
    the balance is a polypropylene resin comprising at least two selected from the group consisting of a homopolypropylene, a propylene-ethylene copolymer prepared by polymerizing 50 to 99 wt % propylene monomer and 1 to 50 wt % ethylene monomer, and a high crystalline polypropylene (HCPP) prepared by polymerizing 90 to 99.9 wt % propylene monomer and 0.1 to 10 wt % $C_4$ to $C_{10}$ alkylene monomer.

2. The polypropylene resin composition of claim 1, wherein the homopolypropylene has an isotactic index of 94 to 97% measured by $C_{13}$-NMR and a melt index of 0.5 to 100 g/10 min (2.16 kg, 230° C.).

3. The polypropylene resin composition of claim 1, wherein the high crystalline polypropylene has an isotactic index of 97.5 to 99.5% measured by $C_{13}$-NMR and a melt index of 5 to 40 g/10 min (2.16 kg, 230° C.).

4. The polypropylene resin composition of claim 1, wherein the ethylene-α-olefin copolymer has a Mooney viscosity of 5 to 60 ML1+4 (at 121° C.) and a glass transition temperature of −65 to −50° C.

5. The polypropylene resin composition of claim 1, wherein the ethylene-α-olefin copolymer is an ethylene-α-($C_4$ to $C_8$) alkylene copolymer.

6. The polypropylene resin composition of claim 1, wherein the cellulose fiber has a diameter of 3 to 40 μm and a length of 0.3 to 4 mm.

7. The polypropylene resin composition of claim 1, wherein the volcanic rock has an average particle size of 10 to 150 μm and comprises at least one selected from the group consisting of a scoria rock and a basalt rock.

8. The polypropylene resin composition of claim 1, further comprising at least one additive selected from the group consisting of an antioxidant, an ultraviolet absorber, a photostabilizer, a pigment, a dispersant, a nucleating agent, a process lubricant, and a coupling agent.

9. A vehicle interior material comprising the polypropylene resin composition of claim 1.

10. A polypropylene resin composition for creating fabric texture, the polypropylene resin composition comprising:
    20 wt % of a polypropylene elastomer;
    5 to 8.5 wt % of an ethylene-α-olefin copolymer;
    10 to 15 wt % of talc as an inorganic filler;
    0.6 to 3 wt % of at least one cellulose fiber;
    5 to 10 wt % of a volcanic rock; and
    the balance is a propylene resin.

11. The polypropylene resin composition for creating a fabric texture of claim 10, wherein the polypropylene resin comprises at least two selected from the group consisting of a homopolypropylene, a propylene-ethylene copolymer prepared by polymerizing 50 to 99 wt % propylene monomer and 1 to 50 wt % ethylene monomer, and a high crystalline polypropylene (HCPP) prepared by polymerizing 90 to 99.9 wt % propylene monomer and 0.1 to 10 wt % C4 to C10 alkylene monomer.

12. The polypropylene resin composition for creating a fabric texture of claim 10, wherein the polypropylene elastomer is prepared by reacting 20 to 85 wt % ethylene-propylene rubber and 15 to 80 wt % homopolypropylene.

13. The polypropylene resin composition for creating a fabric texture of claim 10, wherein the at least one cellulose fiber is selected from the group consisting of nylon, polyethylene terephthalate (PET), polybutylene terephthalate (PBT), and cellulose.

14. A vehicle interior material comprising the polypropylene resin composition of claim 10.

\* \* \* \* \*